United States Patent
Patience

(10) Patent No.: US 9,487,289 B2
(45) Date of Patent: Nov. 8, 2016

(54) CAVITY ACOUSTIC TONES SUPPRESSION

(71) Applicant: BAE SYSTEMS PLC, London (GB)

(72) Inventor: David Euan Patience, Frimley (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 14/776,324

(22) PCT Filed: Mar. 13, 2014

(86) PCT No.: PCT/GB2014/050760
§ 371 (c)(1),
(2) Date: Sep. 14, 2015

(87) PCT Pub. No.: WO2014/140589
PCT Pub. Date: Sep. 18, 2014

(65) Prior Publication Data
US 2016/0031549 A1    Feb. 4, 2016

(30) Foreign Application Priority Data

Mar. 15, 2013 (EP) .................................... 13275066
Mar. 15, 2013 (GB) .................................... 1304722.0

(51) Int. Cl.
B64C 21/02 (2006.01)
B64C 23/00 (2006.01)
B64C 25/00 (2006.01)

(52) U.S. Cl.
CPC ............ B64C 23/005 (2013.01); B64C 21/02 (2013.01); B64C 2025/003 (2013.01); B64C 2230/08 (2013.01); Y02T 50/166 (2013.01)

(58) Field of Classification Search
CPC ................ B64C 21/02; B64C 23/005; B64C 2025/003; B64C 2230/08
USPC .................................................. 181/286, 293
See application file for complete search history.

(56) References Cited

U.S. PATENT DOCUMENTS 2,451,479 A * 10/1948 Diehl ...................... B64D 1/04
                                                        244/130
2,663,993 A    12/1953 Mosser
(Continued)

FOREIGN PATENT DOCUMENTS

DE    3534268 A1    4/1987
DE    3609541 A1    9/1987
(Continued)

OTHER PUBLICATIONS

EP Search Report dated Oct. 11, 2013 of Patent Application No. 13275064.7 filed Mar. 15, 2013.
(Continued)

Primary Examiner — Jeremy Luks
(74) Attorney, Agent, or Firm — Maine Cernota & Rardin

(57) ABSTRACT

A cavity system that tends to increase the thickness (28) of the shear layer (22), comprising: a cavity (2) and a plate (104); the plate (104) comprising a plurality of holes (4) through it, wherein the proportion of the area of the plate (104) taken up by the holes is ≥60%, for example ≥75% or ≥90%; the plate (104) being positioned in the proximity of a leading edge (14) of the cavity (2); the surface of the plate (104) at a perpendicular or oblique angle to the actual or intended flow direction (6). The plate (104) may be positioned at an oblique angle to the flow direction (6). One or more flow alteration elements, for example elongate members (34) positioned across the holes and/or members (38) positioned directly behind or in front of the holes (4).

16 Claims, 5 Drawing Sheets

(56) References Cited

U.S. PATENT DOCUMENTS

| | | | |
|---|---|---|---|
| 2,749,064 A * | 6/1956 | Kuhlman, Jr. | B64D 1/06 244/130 |
| 5,340,054 A | 8/1994 | Smith | |
| 5,699,981 A | 12/1997 | McGrath | |
| 6,296,202 B1 | 10/2001 | Stanek | |
| 6,739,554 B1 | 5/2004 | Stanek | |
| 2002/0079405 A1 | 6/2002 | Layukallo | |
| 2002/0190164 A1 | 12/2002 | Loth | |
| 2008/0217485 A1 | 9/2008 | Ikeda | |
| 2009/0045286 A1 | 2/2009 | King et al. | |
| 2009/0045289 A1 | 2/2009 | Bilanin et al. | |

FOREIGN PATENT DOCUMENTS

| | | |
|---|---|---|
| DE | 102005007940 A1 | 8/2006 |
| EP | 0673819 A1 | 9/1995 |
| GB | 614274 A | 12/1948 |
| JP | 2002205639 A | 7/2002 |

OTHER PUBLICATIONS

GB Search Report dated Jul. 24, 2013 of Patent Application No. 1304716.2 filed Mar. 15, 2013.
EP Search Report dated Nov. 13, 2013 of Patent Application No. 13275065.4 filed Mar. 15, 2013.
GB Search Report dated Jul. 24, 2013 of Patent Application No. 1304718.8 filed Mar. 15, 2013.
EP Search Report dated Jul. 16, 2013 of Patent Application No. 13275066.2 filed Mar. 15, 2013.
GB Search Report dated Jul. 24, 2013 of Patent Application No. 1304722.0 filed Mar. 15, 2013.

* cited by examiner

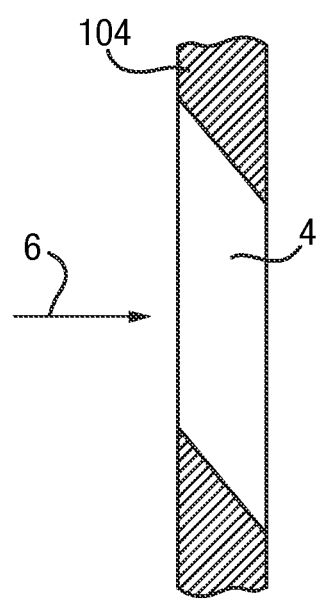

CAVITY ACOUSTIC TONES SUPPRESSION

RELATED APPLICATIONS

This application is a national phase application filed under 35 USC §371 of PCT Application No. PCT/GB2014/050760 with an International filing date of 13 Mar., 2014 which claims priority of GB Patent Application 1304722.0 filed 15 Mar. 2013 and EP Patent Application 13275066.2, filed 15 Mar. 2013. Each of these applications is herein incorporated by reference in their entirety for all purposes.

FIELD OF THE INVENTION

The present invention relates to methods and systems for suppression of acoustic tones and/or resonance and/or other acoustic tone effects in cavities for when they are moving relative to an ambient fluid. The present invention relates in particular to, but is not limited to, such methods and systems for cavities recessed in a surface, for example in a surface of a vehicle, for example aircraft cavities, for example bays, when the aircraft is travelling through air.

BACKGROUND

Considering the case of a surface with a cavity recessed in the surface, when the surface, and hence the recessed cavity, is moving in ambient fluid, for example when an aircraft with an open bay, for example an open weapons bay or an open undercarriage bay, is moving in air, a shear layer is formed between (i) the moving ambient air that is flowing across the surface and across the top of the recessed cavity, and (ii) the static air in the cavity (from the reference point of the aircraft). A vortex is shed from the cavity leading edge and grows as it travels down the shear layer and impacts on the aft (trailing) wall of the bay resulting in the emission of noise. Also the acoustic wave travels back upstream inside the bay. The fluctuating pressure of the acoustic wave may either result in vortices being shed from the leading edge cavity lip or an increase in the growth rate of the vortices such that a series of vortices is formed down the shear layer at a preferential rate which is related to the frequency of the upstream acoustic wave. The vortices grow into large scale structures as they propagate downstream in the shear layer and then impact the aft (trailing) wall of the bay at a characteristic rate. This results in acoustic noise being generated at a characteristic rate which may be described as acoustic tones of a characteristic frequency.

The frequency of the tones may be formulated using Rossiter's equation. It can be seen that here is a feedback loop formed by the passage of the vortices and the upstream propagating acoustic wave.

It is known in aircraft to employ spoiler arrangements to divert the airflow over and beyond a recessed cavity, i.e. over and beyond any boundary layer or prospective shear layer so that the above described effects do not take place. It is further known to include holes in such spoilers for the purpose of reducing the weight of the spoiler. Accordingly, the holes are sized and/or spaced so as to provide weight loss without substantially disrupting the operation of the spoiler in diverting substantially all of the impinging fluid flow. In other words, it is the case that such prior art arrangements reduce or remove the size of the shear layer. It is understood that accordingly for such known spoilers the proportion of the active spoiler area that is taken up by the holes is usually less than 30%. A report (Technical Report AFFDL-TR-79-3003 published February 1979 by Air Force Flight Dynamics Laboratory, Air Force Wright Aeronautical Laboratories, Air Force Systems Command, Wright-Patterson Air Force Base, Ohio 45433, USA), titled "Evaluation of F-111 Weapon Bay Aero-Acoustic and Weapon Separation Improvement Techniques", authored by Rodney L. Clark, appears to mention, but not evaluate, a spoiler with the proportion of the area taken up by the holes being 50%.

It is also known to employ meshes or plates with holes over the entrance of air intakes or the entrance of other tunnel like arrangements, for the purpose of preventing physical objects to enter the air intake or other tunnel-like arrangement. Examples of publications in which such meshes and/or plates are: DE 10 2005 007940 A1, U.S. Pat. No. 2,663,993 A, U.S. 2009/045286, and GB 614 274 A. It is noted that such arrangements, even if considered as including a cavity as such, do not include cavities that are of the type being addressed in the present invention which on the contrary are cavities recessed in a surface.

U.S. Pat. No. 5,699,981 discloses an aircraft cavity acoustic resonance suppression system which comprises a small diameter, substantially cylindrically shaped member disposed substantially parallel to and spaced up to a distance corresponding to about three airflow boundary layer thicknesses from the surface of an aircraft near the leading edge of the cavity and transverse to airflow thereacross. An actuator is provided to select the adjustment of the spacing between the member and the aircraft surface according to different operational speeds and hence different operational boundary layer thicknesses as the member's spacing of about three airflow boundary layer thicknesses from the surface of the aircraft is disclosed as critical.

SUMMARY OF THE INVENTION

The present inventor has realised that it would be desirable to provide a form of suppression by generating multiple fine scale turbulances i.e. resulting in multiple small vortices, within the shear layer, thereby disrupting the formation of large scale vortices in the shear layer which are part of the tone generation process, and moreover to provide that the multiple fine scale turbulances tend not to combine into larger ones. The present inventor has further realised that one way, for example, to deter the combination of the fine scale turbulence into larger ones would be to increase the thickness of the shear layer formed at the cavity (note for example, that in contrast the known spoilers with weight-reducing holes described earlier above in complete contrast aim to avoid a shear layer or at least reduce the thickness of any remaining shear layer). The present inventor has realised that, conventionally, an upstream acoustic wave interacts with the vortices in the shear layer at approximately common times i.e. they display a temporal coherence. The present inventor has realised that in contrast, by providing a thicker shear layer, the vortices closer to the stream flow will propagate downstream faster than those closer to the static air in the bay. The present inventor has realised that therefore at some point downstream the vortices will arrive at different times to each other. The present inventor has realised that this loss of temporal coherence will disrupt the formation of the conventional large scale turbulent structures that would otherwise play a key role in the generation of unwanted acoustic tones. The present inventor has further realised that it would be desirable to provide a suppression system comprising elements that readily accommodated differing boundary layer thicknesses without requiring positional adjustment, unlike the system disclosed in U.S. Pat. No. 5,699,981.

In a first aspect, the invention provides a cavity system, comprising: a cavity recessed in a surface, and a plate; the plate comprising a plurality of holes through it, wherein the proportion of the area of the plate taken up by the holes is ≥60%; the plate being positioned in the proximity of a leading edge of the cavity, the leading edge being relative to an actual or intended flow direction of a fluid over the cavity; the plate arranged with the surface of the plate at a perpendicular or oblique angle to the actual or intended flow direction.

The surface may be a surface comprised by a vehicle. The vehicle may be an aircraft, or a missile, or any other type of vehicle, for example a car or a lorry, or a sea vessel, including for example a submarine.

The plate may be entirely downstream of the leading edge.

The plate may be positioned at an oblique angle to the flow direction such that some of the holes are further away from the leading edge in the flow direction compared to other of the holes.

The plate may have a non-planar surface.

One or more flow alteration elements may be provided at one or more of the holes.

The flow alteration elements may comprise or provide additional edges at the one or more holes that are in addition to the edge or edges provided by the underlying shape of the hole or holes.

At least some of the flow alteration elements may comprise an elongate member positioned across the hole.

At least some of the flow alteration elements comprise a member positioned directly behind or in front of the hole.

One or more of the holes may have a different cross-sectional shape and/or have a different diameter or other relevant dimension to one or more of the other holes.

The proportion of the area of the plate taken up by the holes may be ≥75%.

The proportion of the area of the plate taken up by the holes may be ≥90%.

The plate may be positioned at a distance from the leading edge that is ≤0.2× the distance between the leading edge and an aft edge.

The plate may be positioned at a distance from the leading edge that is ≤0.1× the distance between the leading edge and the aft edge.

The plate may be positioned at a distance from the leading edge that is ≤0.05× the distance between the leading edge and the aft edge.

The plate may be in the form of gauze or mesh.

The effect of the plate comprising the holes may be to increase the thickness of the shear layer.

BRIEF DESCRIPTION OF THE DRAWINGS

FIG. 10 is a schematic (not to scale) illustration showing a hole in cross-sectional view as viewed perpendicular to the flow direction.

DETAILED DESCRIPTION

It will be appreciated that relative terms such as horizontal and vertical, top and bottom, above and below, front and back, and so on, are used above merely for ease of reference to the Figures, and these terms are not limiting as such, and any two differing directions or positions and so on may be implemented rather than truly horizontal and vertical, top and bottom, and so on. In particular, for convenience, in the Figures a cavity is shown with it opening at the top of the page, and so for convenience the word "top" is used to mean the opening of the cavity, and the word "above" means further away from the cavity, However, it will be appreciated that the present invention refer also to cavities positioned for example underneath the wing or fuselage of e.g. an aircraft, i.e. upside down to that shown in the Figures, but the description use of the word "top" will still refer to the opening part of the cavity and that of the word "above" will still refer to being away from the cavity.

Figure 1:
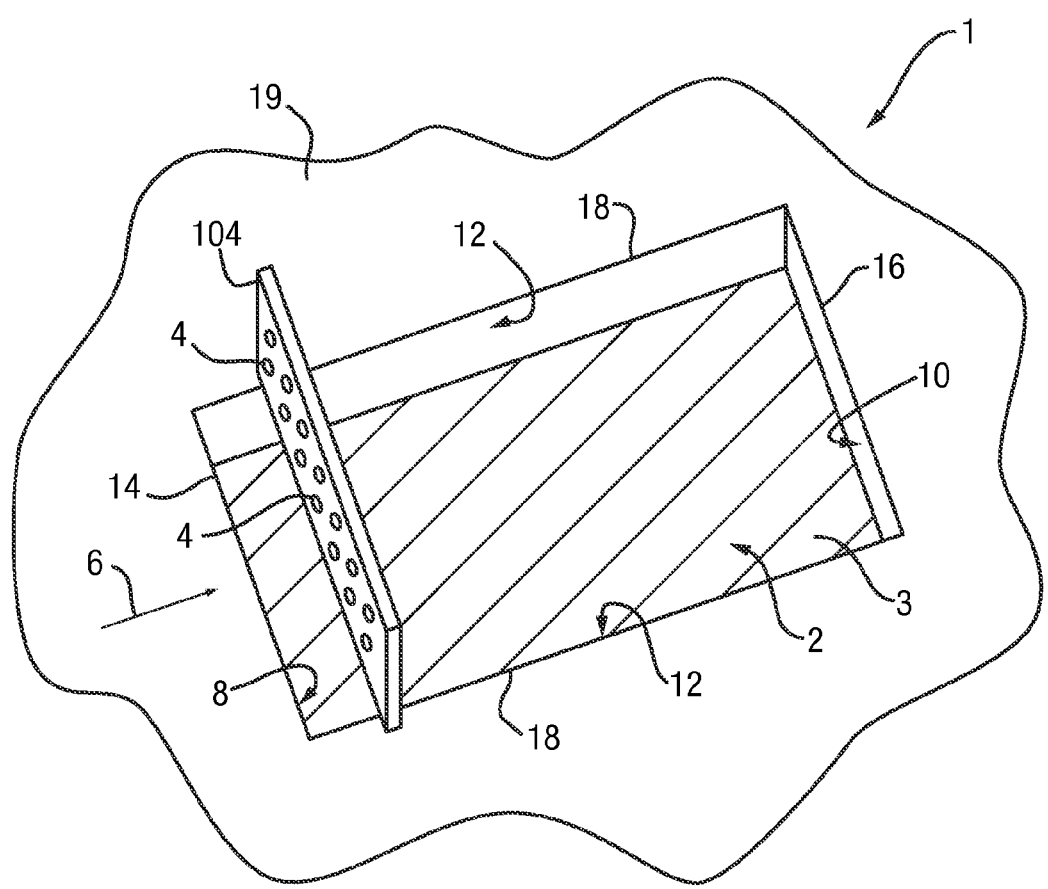
FIG. 1 is a schematic illustration (not to scale) of a perspective view of a cavity acoustic tones suppression system.

FIG. 1 is a schematic illustration (not to scale) of a perspective view of a first embodiment of a cavity acoustic tones suppression system 1 (hereinafter referred to as the suppression system 1). The suppression system 1 comprises a cavity 2, and a member having a substantially plate form (hereinafter referred to as a plate) 104. In this embodiment the cavity 2 is in a surface 19. The plate 104, has a plurality of holes 4 (which may also be termed channels) passing through it.

In this embodiment the plate 104 has planar surfaces (i.e. non-curved).

Figure 2:
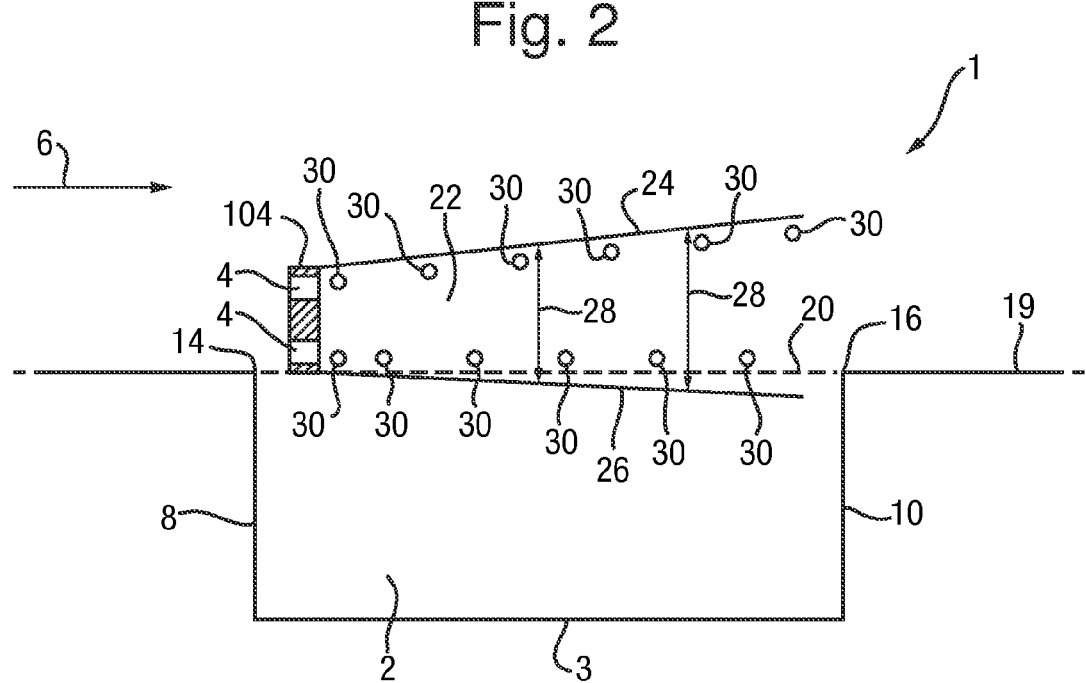
FIG. 2 is a schematic cross-sectional view of (not to scale) of the suppression system of FIG. 1.

In this embodiment the cavity 2 is a cavity 2 recessed in a surface 19 of an aircraft (in FIG. 2 the external boundary of the surface 19 is schematically identified by a zig-zag line to indicate in conventional drawing-style form that the extent of the surface 19 being schematically shown is not necessarily limited to the drawing page). The surface 19 is substantially planar, although not necessarily flat and not necessarily without non-uniformities or items fixed thereto. In this embodiment, the cavity 2 is rectangular and comprises a planar base 3. In FIG. 1 the planar base 3 is schematically shown in hatched shading. The cavity 2 further comprises, defined relative to an actual or intended flow direction 6 (the flow direction 6 being across, or over, the surface 19 and the cavity 2), a leading wall 8, an aft (trailing) wall 10, and two side walls 12. In this embodiment these walls are all perpendicular to the planar base 3. At the top of the cavity 2, the cavity 2 comprises, for each of these walls respectively, a leading edge 14, an aft (trailing) edge 16, and two side edges 18.

In this embodiment the plate 104 is, arranged with its surface extending across the width of the cavity i.e. in a transverse direction to the flow direction 6, i.e. in this embodiment parallel with the front and aft (trailing) edges and walls, i.e. the holes are arranged such that the flow direction 6 impinges on the holes 4. Thus in this embodiment the plate 104 is positioned perpendicularly to the flow direction 6. As a consequence holes that are located at different heights on the plate are positioned directly above and below each other, i.e. at equal distances, in the flow direction 6, from the leading edge 14.

The area of the plate taken up by the holes 4, the number of holes, and the diameter of the holes 4, are determined such that the impinging fluid flow substantially passes through the holes 4 rather than being diverted over the top of the cavity in the way that would substantially happen with a spoiler with no holes or holes included primarily to reduce the weight of a spoiler. For clarity only ten holes 4 are shown in FIG. 1, but in practice the plate 104 will typically contain many more than ten holes 4. In this embodiment the proportion of the area of the plate 104 taken up by the holes 4 is 60%, and more generally any proportion ≥60% may be employed. In other embodiments even higher proportions may be employed to provide even stronger suppression effects. For example, an even more preferred proportion of the area of the plate taken up by the holes 4 is ≥75%, and a yet further preferred proportion of the area of the plate taken up by the holes 4 is ≥90%.

In this embodiment the plate 104 is positioned downstream of the leading edge 14 (i.e. above the cavity 2), and the plate 104 is positioned closer to the leading edge 14 than it is to the aft (trailing) edge 16. More particularly, in this embodiment the plate 104 is positioned such that the distance of the plate 104 from the leading edge 14 equals 0.05× the total distance between the leading edge 14 and the aft (trailing) edge 14.

In this embodiment, the plate 104 is positioned such that its lowest extremity (as viewed on the page in the Figures) is approximately level with the top (opening) of the cavity 2 (i.e. level with the dotted line indicated by reference numeral 20), i.e. approximately level with the leading edge 14. In other words, in this embodiment the plate does not 104 extend down into the cavity.

In this embodiment the holes 4 are all of circular cross-sectional shape.

In this embodiment the holes 4 are all of the same (circular) cross-sectional shape as each other, and are all of the same diameter as each other.

In this embodiment the holes 4 pass through the plate 104 parallel to the flow direction 6, i.e. the surface of the plate 104 is perpendicular to the flow direction 6, i.e. the holes extend perpendicularly through the plate 104.

In this embodiment the plate 104 extends completely across the width of the cavity 2.

In this embodiment the holes 4 are all spaced in a symmetric evenly spaced arrangement i.e. the holes 4 are distributed evenly over the plate 104.

The tendency of the suppression system 1 to suppress acoustic tones when in operation will now be described with reference to FIG. 2. FIG. 2 is a schematic cross-sectional view of (not to scale) of the suppression system 1 of FIG. 1. Elements of the system shown in FIG. 2 that were also shown in FIG. 1 are the following: the cavity 2, the planar base 3, plate 104 comprising the plurality of holes 4, the flow direction 6, the leading wall 8, the aft (trailing) wall 10, the leading edge 14, the aft (trailing) edge 16, and the surface 19 (which may also be considered as the plane of the surface).

As can be further appreciated from FIG. 2, a gap or major change in orientations in the surface 19 in effect provides the opening of the cavity 2, and the cavity 2 is in the form of a recess in the surface 19. It is noted that the terminology "cavity recessed in a surface" as used herein includes cases where the overall effect or geometry of the cavity is that it will be recognised as a "cavity recessed in a surface", even if strictly speaking the surface 19 and/or one or more of the walls 8, 10, 12 and/or the planar base 3 are not made from a single continuous piece or type of material.

Also shown (in dotted line form) in FIG. 2 for ease of explanation later below is a hypothetical extension 20 of the surface 19 over the cavity 2.

In operation, one effect of the plate 104 comprising the plurality of holes 4 is to tend to increase the thickness of the shear layer 22 compared to if the plate 104 with holes 4 was not present, or indeed if there was a plate present that nevertheless had no holes or with less than 50% of its area being of holes. This is at least in part due to the holes 4 presenting a disruption or change to the air flow direction to deflect the flow both in and out of the cavity (the latter being nevertheless near the top of the cavity). The shear layer 22 is represented schematically in FIG. 2 as the region between a line representing the top 24 (i.e. furthest away from the cavity 2) of the shear layer 22 and a line representing the bottom 28 (i.e. closest to the cavity 2) of the shear layer. The thickness 28 of the shear layer 22 at any point along the cavity 2 is correspondingly the distance between the top 24 of the shear layer 22 and the bottom 26 of the shear layer 22.

In operation, a further effect of the plurality of holes 4, spread over different heights over the extent of the surface of the plate 104, is to tend to provide multiple sources of fine scale turbulence giving rise to a plurality of small vortices 30 at differing heights. Due at least in part to the thicker shear layer 22, in particular the plurality of heights at which the vortices are shed due to the different heights of the different holes 4, the vortices 30 tend not to combine into larger ones. By provision of the thicker shear layer 22, and the plurality of heights at which the vortices are shed due to the different heights of the different holes 4, the vortices 30 closer to the top 24 of the shear layer 22 (i.e. closer to the ambient fluid flow) propagate downstream faster than those vortices 30 closer to the bottom 26 of the shear layer 22 (i.e. closer to the static air in the cavity 2). Accordingly the vortices 30 arrive at given points downstream at different times i.e. there is a loss of temporal coherence, and consequently there is a disruption of the conventional tendency for formation of large scale turbulent structures that would otherwise play a key role in the generation of unwanted acoustic tones. Furthermore by virtue of the additional height achieved in total by use of the overall height of the plate 104, differing boundary layer thicknesses tend to be readily accommodated (without requiring positional adjustment).

In further embodiments, flow alteration elements are provided in relation to one or more (preferably all) of the holes 4. The flow alteration elements may increase the deflection of the vortices 30 into and/or out of the cavity 2, thereby further enhancing the thickening of the shear layer 22. The flow alteration elements may additionally or alternatively serve as additional sources of fine scale turbulence giving rise to yet further small vortices 30, hence tending to provide yet further loss of temporal coherence.

Figure 3:
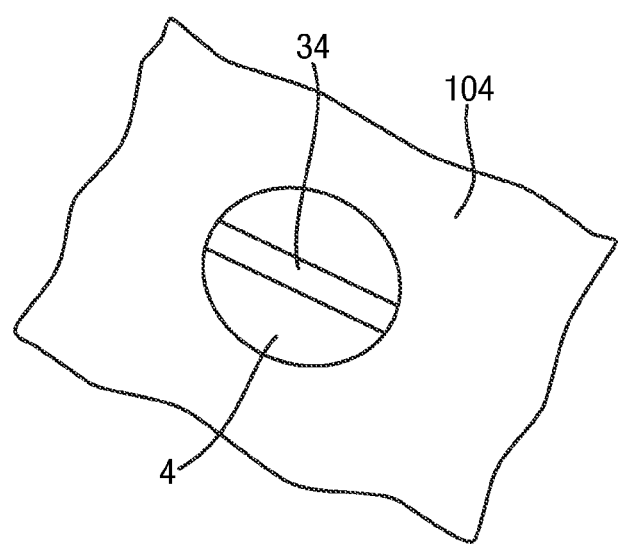
FIG. 3 is a schematic illustration (not to scale) of a hole with a flow alteration element provided at it.

FIG. 3 is a schematic illustration (not to scale) of a hole 4 of one such embodiment with flow alteration elements provided at one or more (preferably all) of the holes 4. In FIG. 3 the hole 4 is viewed from the front, i.e. as would be seen by the flow direction 6.

A member, e.g. an elongate member, e.g. a rod 34 (or alternatively, for example, a vane) is positioned across the hole 4 (i.e. in this embodiment the flow alteration element is the rod 34). The rod 34 is arranged such that in operation some of the fluid impacting the hole 4 is diverted by the rod 34, thereby providing additional sources of fine scale turbulence (hence additional vortices 30) and/or increasing the deflection of the vortices 30 into and/or out of the cavity 2, thereby further enhancing the thickening of the shear layer 22.

In this embodiment, the rod 34 extends across a diameter of the hole 4 (and in corresponding embodiments where the hole 4 is shaped other than in the form of a circle, across a corresponding central crossing point, e.g. the diagonal of a rectangle). However this need not be the case, and in other embodiments, for one or more of the holes 4, the rod 34 may extend across between two other points of the hole 4.

In this embodiment the member is a straight rod 34, however this need not be the case, and in other embodiments, for one or more of the holes 4, the member positioned across the hole may be other than a straight rod, e.g. it may be Y-shaped.

Figure 4:
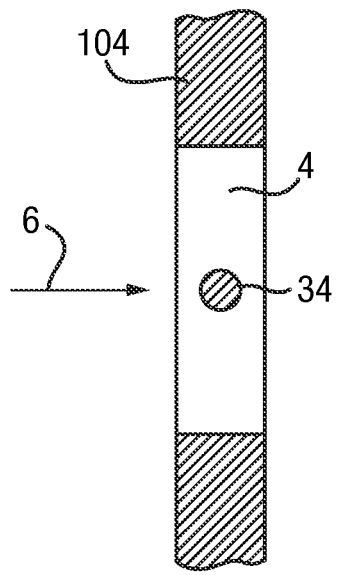
FIG. 4 is a schematic (not to scale) illustration showing a hole in cross-sectional view as viewed perpendicular to the flow direction.
Figure 5:
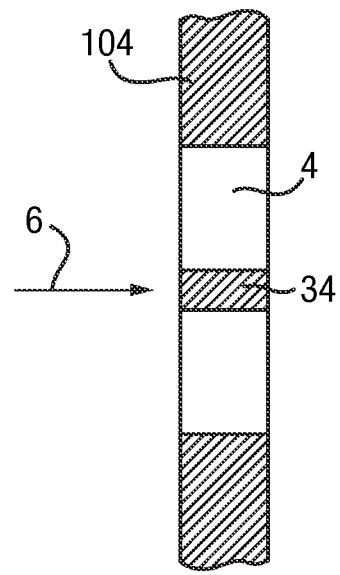
FIG. 5 is a schematic (not to scale) illustration showing a hole in cross-sectional view as viewed perpendicular to the flow direction.
Figure 6:
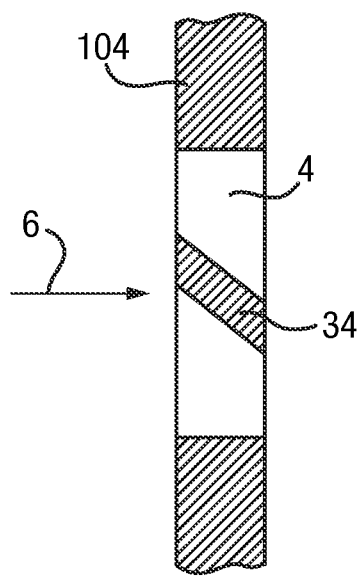
FIG. 6 is a schematic (not to scale) illustration showing a hole in cross-sectional view as viewed perpendicular to the flow direction.

In this embodiment, as shown in FIG. 4, the rod 34 is of circular cross-section. Each of FIG. 4, FIG. 5, and FIG. 6 is a respective schematic (not to scale) illustration showing the hole 4 in cross-sectional view as viewed perpendicular to the flow direction 6, and the same reference numerals are used for the same features as were used in the earlier Figures. In other embodiments, for one or more of the holes 4, the rod (or vane) 34 is of a cross-sectional shape other than circular, for example rectangular as shown in FIG. 5. In the embodiment shown in FIG. 5 the rod 34 extends across the depth of the hole 4 fully parallel to the flow direction 6, i.e. it remains at the same relative separations from the top and bottom of the hole 4 across the complete depth of the hole 4. However, this need not be the case, and in other embodiments the rod 34 extends across the depth of the hole 4 in a direction other than fully parallel to the flow direction 6, i.e. at different relative separations from the top and bottom of the hole 4 across the complete depth of the hole 4, as for example in the case of the embodiment shown in FIG. 6, where the rod 34 (or vane) provides an obliquely angled surface to the impinging flow direction 6.

Figure 7:
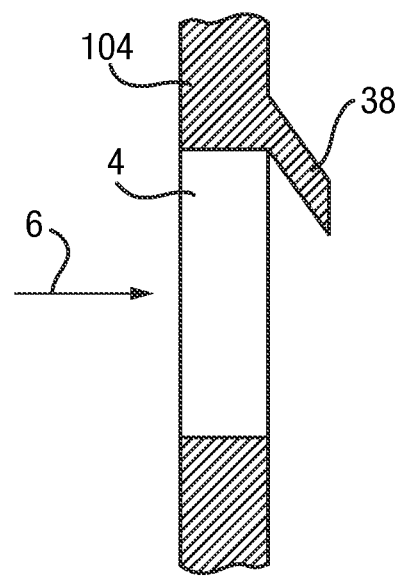
FIG. 7 is a schematic illustration (not to scale) of a hole with a flow alteration element provided at it.

FIG. 7 is a schematic illustration (not to scale), of a hole 4 of a further such embodiment with flow alteration elements provided at one or more (preferably all) of the holes 4. FIG. 7 shows the hole 4 in cross-sectional view as viewed perpendicular to the flow direction 6, i.e. the same view as shown in FIGS. 4-6, and the same reference numerals are used for the same features as were used in the earlier Figures.

A member, e.g. a an angled member, e.g. a vane 38 (or alternatively, for example, a tab or protrusion or spoiler) is positioned directly behind the hole 4 (i.e. in this embodiment the flow alteration element is the vane 38). The vane 38 is arranged such that in operation some of the fluid impacting the hole 4 is diverted by the vane 34, thereby providing additional sources of fine scale turbulence (hence additional vortices 30) and/or increasing the deflection of the vortices 30 into and/or out of the cavity 2, thereby further enhancing the thickening of the shear layer 22.

In this embodiment, the vane 38 extends from the top of the hole 4 at an angle to the airflow direction 6. However this need not be the case, and in other embodiments, for one or more of the holes 4, the vane may extend in any direction, and from any point of the hole, arranged to provide the required fluid flow. Furthermore, the skilled person may use any appropriate profile to provide the required fluid flow. For example the vane 38 may have a curved outline profile, e.g. semi-circular as viewed along the flow direction 6, or it may be rectangular, or irregularly shaped, and so on.

In further embodiments, at one or more of the holes with vanes 38, the vane 38 positioned directly in front of the hole 4 rather than directly behind the hole 4.

In embodiments where flow alteration elements are provided on one or more of the holes 4, such as those embodiments described above with reference to FIGS. 3-7, the following variations (i) to (vii) are, for example, possible.

(i) For one or more of the holes provided with flow alteration elements, the holes may comprise one or plural flow alteration elements. For example, where each flow alteration element is a member across a hole, two or more members may be provided on a single hole (or on each of a plurality of holes), the members being arranged above each other and/or beside each other, for example.

(ii) Where the flow alteration elements are vanes, and there are plural vanes at a given hole, the plural vanes may be provided all on the same side (i.e. behind or in front) of the hole, or on both sides of the hole.

(iii) Where the flow alteration elements are vanes, and there are plural vanes on a given hole, one or more of the vanes may extend a different distance from the hole, and/or at a different angle or direction, to other vanes.

(iv) Similar to (iii), a vane at one hole may be different in character, e.g. may extend a different distance from the hole and/or at a different angle or direction, to one or more vanes at one or more of the other holes.

(v) For holes with plural flow alteration elements provided at them, the plural flow alteration elements may all be rods, or may all be vanes, or may be a mixture of each.

(vii) In the above embodiments with flow alteration elements at the holes, the flow alteration elements are rods across the holes and/or vanes behind or in front of the holes. However, in other embodiments any other forms of flow alteration elements may be provided, additionally or alternatively, at one or more of the holes. For example, one or more of the flow alteration elements may comprise any other form of obstruction to or diversion to some of the airflow impinging on the hole.

(viii) In the above embodiments the flow alteration elements are elongate members positioned across a hole and/or members positioned directly behind or in front of a hole. Both of these types may be considered as elements that comprise or provide additional edges at the one or more holes that are in addition to the edge or edges provided by the underlying shape of the hole or holes. In other embodiments, in addition to or instead of the elongate members positioned across a hole and/or members positioned directly behind or in front of a hole, any other suitable type or types of flow alteration elements may be provided that comprise or provide additional edges at the one or more holes that are in addition to the edge or edges provided by the underlying shape of the hole or holes. In yet further embodiments, in addition to or instead of elements that comprise or provide additional edges at the one or more holes that are in addition to the edge or edges provided by the underlying shape of the hole or holes, any other suitable type or types of flow alteration elements may be provided that alter the flow so as to provide additional sources of fine scale turbulence (hence additional vortices 30) and/or increase the deflection of the vortices 30 into and/or out of the cavity 2, thereby further enhancing the thickening of the shear layer 22.

Returning to a more general discussion of further embodiments, in the above embodiments the holes 4 are all of circular cross-sectional shape. However, this need not be the case, and in other embodiments, the holes 4 may all be the same cross-sectional shape, where that shape is other than circular e.g. a non-circular curved shape, or a non-curved shape, e.g. rectangular.

In the above embodiments the plate 104 extends completely across the width of the cavity 2. However, this need not be the case, and in other embodiments the plate 104 may extend only across a part of the width of the cavity 2, but this will be preferably at least half the width of the cavity 2, and yet more preferably over at least three quarters (¾) of the width of the cavity 2.

In general it will be appreciated that any non-uniformity introduced into the form of one or more of the individual holes 4 (for example by, but not limited to, inclusion of one or more flow alteration elements as described earlier above) and/or any non-uniformity introduced between one or more of the different holes 4 and/or their relative arrangements/positions etc. will tend to provide the possibility of increased numbers or variations of sources of fine scale turbulence, with corresponding increased numbers of small vortices and/or thicker shear layer and/or increased disruption of the temporal coherence of the small vortices, any of which effects may further improve the suppression performance of the suppression system 1. The following further embodiments (i) to (iii) are further examples of embodiments introducing or enhancing such nun-uniformity.

(i) In the above embodiments the holes 4 are all of the same (circular) cross-sectional shape as each other, and are all of the same diameter as each other. However, this need not be the case, and in other embodiments one or more of the holes 4 may have a different cross-sectional shape and/or may have a different diameter or other relevant dimension to the other holes 4.

(ii) In the above embodiments the holes 4 are all spaced in a symmetric evenly spaced arrangement, i.e. the holes 4 are distributed evenly over the plate 104. However, this need not be the case, and in other embodiments some or all of the holes are distributed unevenly over the plate 104. An uneven distribution, and in particular a non-even height distribution, will tend to further disrupt the temporal coherence of the small vortices.

Figure 8:
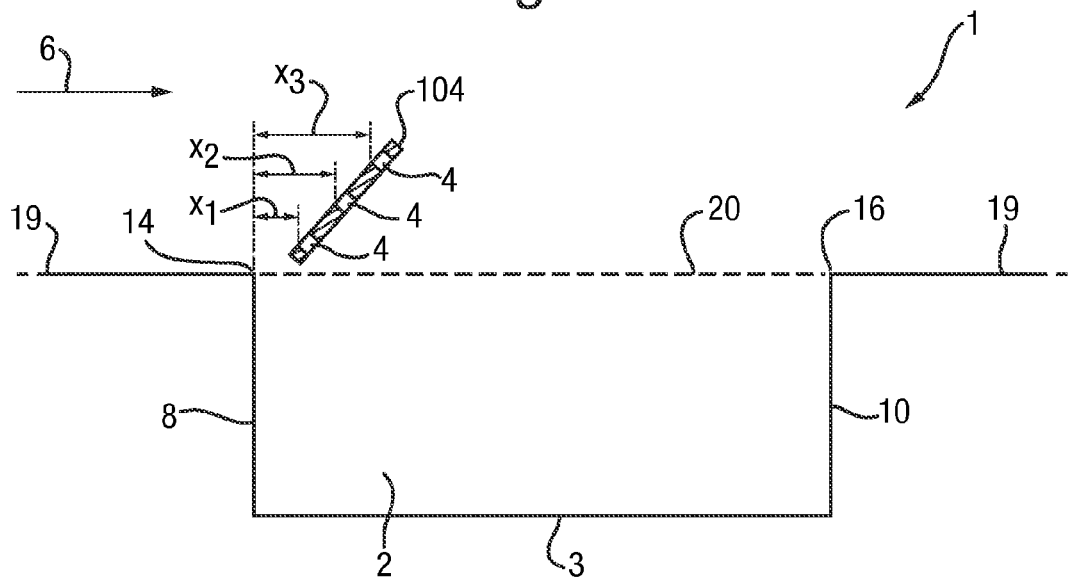
FIG. 8 is a schematic cross-sectional view (not to scale) of a suppression system.
Figure 9:
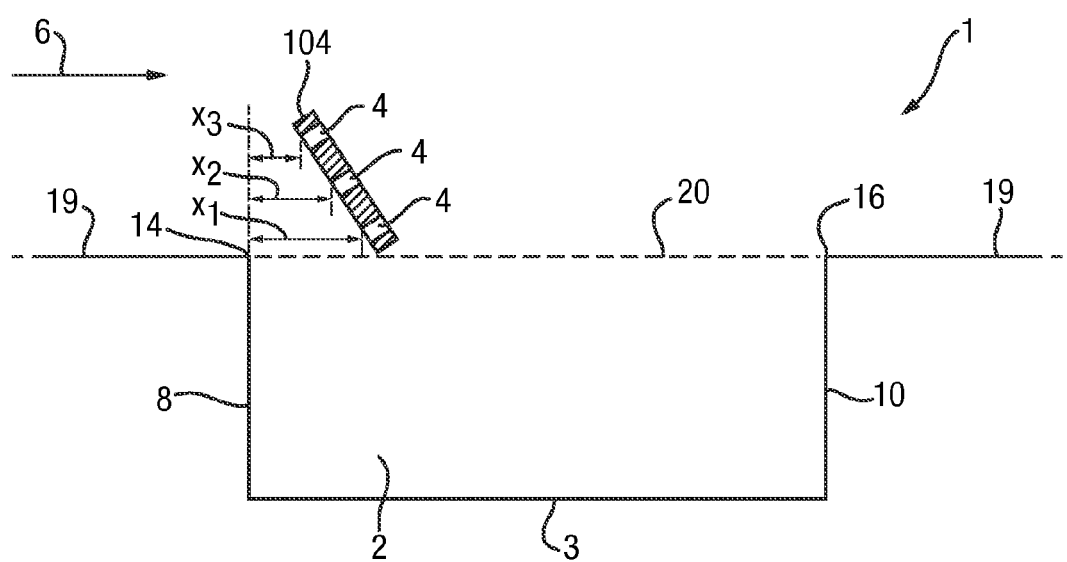
FIG. 9 is a schematic cross-sectional view (not to scale) of a suppression system.

(iii) In the above embodiments the plate 104 is positioned perpendicularly to the flow direction 6. As a consequence holes that are located at different heights on the plate are nevertheless positioned directly above and below each other. However, this need not be the case, and in other embodiments the plate 104 is positioned at an oblique angle (in the vertical plane as viewed in the Figures) to the flow direction 6. As a consequence, in these other embodiments holes that are located at different heights on the plate are positioned at different distances from the leading edge in the direction of the flow direction 6. One embodiment of a suppression system 1 with an obliquely angled plate 104 is shown in FIG. 8, which is a schematic cross-sectional view (not to scale) of the suppression system 1, in which the same reference numerals are used for the same features as were used in the earlier Figures. In this embodiment the front surface of the plate 104 presents an obtuse angle to the impinging flow direction 6. For clarity only three different heights of holes 4 are shown, but in practice there may be many more different heights at which holes are located. In FIG. 8 the distance of each hole from the leading edge is indicated as $x_n$. Due to the angled arrangement of the plate 104, holes at different heights are located at different distances, along the flow direction 6, from the leading edge 14, i.e. $x_1 \neq x_2 \neq x_3$. This will tend to encourage shedding of the vortices 30 to occur at different times, i.e. at different stages of the formation of the shear layer 2 (by providing sources of fine scale turbulence at differing points in time along the flow), hence tending to further increase the extent of the disruption of temporal coherence between the different vortices 30 shed by the different holes. Another embodiment of a suppression system 1 with an obliquely angled plate 104 is shown in FIG. 9, which is a schematic cross-sectional view (not to scale) of the suppression system 1, in which the same reference numerals are used for the same features as were used in the earlier Figures. In this embodiment the front surface of the plate 104 presents an acute angle to the impinging flow direction 6.

In the above embodiments the plate 104 has planar surfaces (i.e. non-curved). However, this need not be the case, and in other embodiments the plate 104 may have curved surfaces. This will also give holes at different heights are located at different distances, along the flow direction 6, from the leading edge, thus will tend to encourage shedding of the vortices 30 to occur at different times, i.e. at different stages of the formation of the shear layer 2 (by providing sources of fine scale turbulence at differing points in time along the flow), hence tending to further increase the extent of the disruption of temporal coherence between the different vortices 30 shed by the different holes.

Returning to a more general discussion of further embodiments, in the above embodiments the plate 104 is positioned downstream of the leading edge, with the plate 104 positioned such that the distance of the plate 104 from the leading edge 14 equals 0.05× the total distance between the leading edge 14 and the aft (trailing) edge 14. However this need not be the case, and in other embodiments the plate 104 may be positioned at any position downstream of the leading edge that is in the proximity of the leading edge. This may include, for example, any position downstream of the leading edge that is closer to the leading edge 14 than it is to the aft (trailing) edge 16, as some degree of suppression will still tend to occur. However, preferably the plate 104 is positioned closer to the leading edge than that, as then an even greater extent of the suppression effect will tend to occur. For example, as well as the preferred positioning at a distance downstream from the leading edge of 0.05× the total distance between the leading edge 14 and the aft (trailing) edge 16, even more preferred is any positioning at a distance of ≤0.05× the total distance, but also preferred more generally is positioning at a distance of ≤0.1× the total distance, and yet more generally any positioning at a distance of ≤0.2× the total distance.

In the above embodiments, the plate 104 is positioned downstream of the leading edge 14 (i.e. above the cavity 2). However, this need not be the case, and in other embodiments the plate 104 may be positioned upstream of the leading edge 14, i.e. above the surface 19 rather than above the cavity 2. In such embodiments, the plate 104 may be positioned upstream from the leading edge 14 at any position in the proximity of the leading edge, which may be at any distance from the leading edge≤half the distance between the leading edge 14 and the aft (trailing) edge 16. Preferably, however, the plate 104 is positioned upstream from the leading edge at a distance from the leading edge ≤0.2× the distance between the leading edge 14 and the aft (trailing) edge 16; more preferably at a distance from the leading edge ≤0.1× the distance between the leading edge 14 and the aft (trailing) edge 16; and yet more preferably at a distance from the leading edge ≤0.05× the distance between the leading edge 14 and the aft (trailing) edge 16.

In yet further embodiments, the plate 104 may be positioned directly over the leading edge 14. (It will also be appreciated that in those embodiments where the plate is arranged at an oblique angle to the flow direction, respective different heights of the plate 104 may be located at any two or three of the above possibilities, namely downstream of the leading edge, directly above the leading edge, and upstream of the leading edge.)

In this embodiment, the plate 104 is positioned such that its lowest extremity (as viewed on the page in the Figures) is approximately level with the top (opening) of the cavity 2 (i.e. level with the dotted line indicated by reference numeral 20), i.e. approximately level with the leading edge 14. In other words, in this embodiment the plate 104 does not extend down into the cavity 2. However, this need not be the case, and in other embodiments, a portion of the plate 104 may extend down into the cavity 2.

In the above embodiments the holes 4 pass through the plate 104 parallel to the flow direction 6, i.e. the surface of the plate 104 is perpendicular to the flow direction 6, i.e. the holes extend perpendicularly through the plate 104. However, this need not be the case, and in other embodiments one or more of the holes 4 may pass through the plate in an obliquely angled direction i.e. non-perpendicular to the surface of the plate 104, for example as shown in FIG. 10, which is a schematic (not to scale) illustration showing the hole 4 in cross-sectional view as viewed perpendicular to the flow direction 6, and in which the same reference numerals are used for the same features as were used in the earlier Figures.

As stated earlier above, the suppression system 1 comprises a cavity 2 and a plate 104 that has a plurality of holes 4 (which may also be termed channels) passing through it. In the above embodiments the plate 104 may be provided with the holes 4 using any appropriate manufacturing technique, for example by drilling holes through a plate, or by injection moulding a plate comprising holes. In corresponding fashion, in those embodiments where flow alteration elements are included at the holes, the flow alteration elements may be provided by any appropriate manufacturing technique. In yet further embodiments, the plate 104 that has a plurality of holes 4 passing through it may be provided in the form of a gauze or mesh, with a wire or other material form being of sufficient structural size compared to the holes in the mesh to provide the required level of physical stability. The use of a gauze or mesh is particularly convenient for those embodiments where the proportion of the area of the plate 104 taken up by the holes 4 is relatively high, for example in the earlier mentioned embodiment in which the area of the plate taken up by the holes 4 is ≥75%, and even more so in the earlier mentioned embodiment in which the area of the plate taken up by the holes 4 is ≥90%.

In the above embodiments, the cavity 2 is rectangular and comprises a planar base 3, the cavity 2 further comprises, defined relative to an actual or intended flow direction 6, a leading wall 8, an aft (trailing) wall 10, and two side walls 12, and these walls are all perpendicular to the planar base 3. However, these specific cavity details are not essential, and in other embodiments any other cavity shape may be present. For example, there need not be only four walls, the walls need not be straight or perpendicular, the cavity may be defined by one or more walls forming a curved or partially curved perimeter to the cavity, the perimeter may be irregularly shaped, one or more walls may be sloping, the base and or one or more walls may be undulating or sloped, and so on. However, the suppression will tend to occur more strongly the more straightforwardly the leading edge (compared to the actual or intended airflow direction) is defined or present.

Also, it will be appreciated that in embodiments with cavity shapes as described above, including irregularly shaped cavities, the skilled person will modify such directions described above as parallel, transverse, perpendicular, and the like, which are suitable for regularly shaped cavities, to provide other directions that achieve corresponding functionalities, at least to some extent, as those described above as parallel, transverse, perpendicular, and the like. Also, even when the cavity is regularly shaped, in yet further embodiments, directions that contain a resolved part of the described parallel, transverse, perpendicular, and the like direction may be implemented instead of completely parallel, transverse, perpendicular, and the like directions. For example, the plate and/or holes and/or flow alteration elements may cross a rectangular cavity with a transverse direction that is at an oblique angle to the stated direction, but contains a resolved element of that direction and hence of its effect, for example at a direction of 15°, 30° or 45° to the direction parallel to the leading edge 14.

The above described surface in which the cavity is recessed may be a surface of a vehicle. The vehicle may be an aircraft, or a missile, or any other type of vehicle, for example a car or a lorry, or a sea vessel, including for example a submarine.

What is claimed is:

1. A cavity system, comprising:
   a cavity (2) recessed in a surface (19); and
   a plate (104);
   the plate (104) comprising a plurality of holes (4) through it, wherein the proportion of the area of the plate (104) taken up by the holes is ≥60%;
   the holes comprising one or more flow alteration elements (34, 38) provided at one or more of the holes (4), the one or more flow alteration elements (34, 38) comprising at least one of an elongate member (34) positioned across the hole (4) and a vane (38) proximate the hole;
   the plate (104) being positioned in the proximity of a leading edge (14) of the cavity (2), the leading edge (14) being relative to an actual or intended flow direction (6) of a fluid over the surface (19) and the cavity (2);
   the plate (104) arranged with the surface of the plate (104) at a perpendicular or oblique angle to the actual or intended flow direction (6).

2. The cavity system according to claim 1, wherein the plate (104) is entirely downstream of the leading edge (14).

3. The cavity system according to claim 1, wherein the plate (104) is positioned at an oblique angle to the flow direction (6) such that some of the holes (4) are further away from the leading edge (14) in the flow direction (6) compared to other of the holes (4).

4. The cavity system according to claim 1, wherein the plate (104) has a non-planar surface.

5. The cavity system according claim 1, wherein the one or more flow alteration elements (34, 38) comprise both an elongate member (34) positioned across the hole (4) and a vane (38) at one or more of the holes (4).

6. The cavity system according to claim 5, wherein at least some of the flow alteration elements (34, 38) comprise or provide additional edges at the one or more holes (4) that are in addition to the edge or edges provided by the underlying shape of the hole or holes (4).

7. The cavity system according to claim 5, wherein at least some of the elongate members (34) positioned across the hole (4) comprise a Y-shape.

8. The cavity system according to claim 5, wherein at least some of the flow alteration elements (34, 38) comprise a member (38) positioned directly behind or in front of the hole (4).

9. The cavity system according to claim 1, wherein one or more of the holes (4) has a different cross-sectional shape and/or has a different diameter or other relevant dimension to one or more of the other holes (4).

10. The cavity system according to claim 1, wherein the proportion of the area of the plate (104) taken up by the holes is ≥75%.

11. The cavity system according to claim 10, wherein the proportion of the area of the plate (104) taken up by the holes is ≥90%.

12. The cavity system according to claim 1, wherein the plate (104) is positioned at a distance from the leading edge (14) that is ≤0.2× the distance between the leading edge (14) and an aft edge (16).

13. The cavity system according to claim 12, wherein the plate (104) is positioned at a distance from the leading edge (14) that is ≤0.1× the distance between the leading edge (14) and the aft edge (16).

14. The cavity system according to claim 13, wherein the plate (104) is positioned at a distance from the leading edge (14) that is ≤0.05× the distance between the leading edge (14) and the aft edge (16).

15. The cavity system according to claim 1, wherein the plate (104) is at least partially upstream of the leading edge (14).

16. The cavity system according to claim 1, wherein the effect of the plate (104) comprising the holes (4) is to increase the thickness (28) of the shear layer (22).

* * * * *